Patented June 9, 1936

2,043,259

UNITED STATES PATENT OFFICE 2,043,259

STABILIZED CARBON TETRACHLORIDE

Edmund C. Missbach, Oakland, Calif., assignor to Stauffer Chemical Company, a corporation of California No Drawing. Original application October 9, 1933, Serial No. 692,819. Divided and this application January 23, 1935, Serial No. 3,183

5 Claims. (Cl. 23—250)

This invention relates to the prevention of decomposition of halogenated hydrocarbon compounds, particularly chlorinated aliphatic hydrocarbons, and to the prevention of corrosion by these compounds. It is known that these materials when exposed to moisture, light, air, and heat, particularly during distillation, as in the case of carbon tetrachloride, decompose with the formation of substances of an objectionable character, usually acidic substances which render the material unsuitable for such purposes as extractions as well as corroding equipment. The decomposition I attribute to hydrolysis and liberation of acid or acid bodies which also catalyze the decomposition.

Examples of materials with which the present invention is concerned are carbon tetrachloride, $CCl_4$, chloroform, $CHCl_3$, trichlorethylene, $C_2HCl_3$, tetrachlorethylene, $C_2Cl_4$, pentachlorethylene, $C_2HCl_5$, and the like. Generally, it is concerned with chlorinated and brominated derivatives of methane, ethane, and higher paraffins, as well as ethylene and higher homologues thereof.

The object of this invention is to provide an effective stabilizer for chlorinated hydrocarbons which need be used only in relatively small concentrations.

Another object of this invention is to provide an effective corrosion inhibitor for use in the presence of halogenated hydrocarbons.

I have found that numerous compounds hereinafter set forth are effective stabilizers and corrosion inhibitors for these materials. Of course, one inhibitor may not be practical for reasons other than its corrosion inhibiting properties and choice must be exercised to the end in view. For example, an inhibitor in carbon tetrachloride to be used in dry cleaning clothes must not deleteriously affect fabrics to be cleaned or alter the color thereof.

The corrosion inhibitor used need only be present in a relatively small concentration usually a small fraction of 1%, and compounds of relatively low solubility in the halogenated hydrocarbon have been used effectively. In some cases, where it is desired to use relatively large quantities of the inhibitor, and where the water solubility of the corrosion inhibitor is relatively greater than its solubility in the compound, the inhibitor may be introduced in the form of an aqueous solution. Such a mixture is effective particularly during distillation, by stabilizing the halogenated hydrocarbon in its liquid state as well as in the vapor phase, a sufficient amount of the inhibitor being volatile with the water vapor.

In cases where the solubility of the corrosion inhibitor in the halogenated hydrocarbon compound is relatively very small, it has been found that the efficiency of these particular inhibitors is so great, that only very small quantities of same are required to stabilize the halogenated hydrocarbon compound to the extent demanded in practice. If it is desired to apply larger proportional amounts of an inhibitor of a solid type, it is reduced to a fine powder, and suspended in the halogenated hydrocarbon, which procedure is especially advisable in case of recovering the halogenated hydrocarbon by distillation.

In some other cases, where it is desired to increase the concentration of the inhibitor above its solubility in the halogenated compound, it is dissolved in a solvent compound miscible with the halogen compound and then incorporated. As suitable solvents, I have used the following compounds: ethylal, methylal, n-butyl alcohol, n-propyl alcohol, methyl ethyl ketone, allyl alcohol, allylethyl ether, methyl carbonate, ethyl carbonate, ethyl oenanthate, beta dimethylamino-ethyl alcohol, n-heptaldehyde, and polymerized castor oil. In the case of polymerized castor oil, this material appears to have a metal protecting action and reduces the rate of corrosion apparently by forming a protecting film on the metal.

In all cases, where the corrosion inhibitors mentioned are in the form of solid substances, or are liquids at atmospheric temperatures, and have boiling points considerably higher than that of the halogenated hydrocarbon, they are sufficiently volatile with the water vapor escaping together with the vapor of the halogenated hydrocarbon during distillation. They are therefore not only capable of protecting the latter in the liquid phase, but also in the vapor phase, as have been sufficiently demonstrated by accelerated corrosion tests made in behalf of these corrosion inhibitors, and conducted continuously for a period of 168 hours under reflux in the presence of water, as well as by use for several years under conditions met in practice with carbon tetrachloride.

This case is a division of my parent case 692,819 filed October 9, 1933. In this case I claim the use of aldehyde ammonia and aldehyde substituted ammonia reaction products as hexamethylene tetramine and hexamethylene amine, the aldoximes (hydroxylamine) and hydrazones (hydrazines) and more particularly aldehyde ammonia, heptaldehyde ammonia, aldehyde phenyl hydrozone and benzalazine which are useful in stabilizing as hereinbefore set forth, particularly hexamethylenetetramine and benzalazine. This material (hexamethylene tetramine) I usually dissolve in an aldehyde as heptaldehyde or in polymerized castor oil.

The stabilizing effect and inhibiting action in corrosion of my inhibitor toward decomposition of the halogen content is, I believe, accomplished in one or all of these ways. Firstly, they neutralize or remove any acid or acidic substances present; secondly, they retard the production of acid; thirdly, they form a protective film on the surface of the metal.

This invention, however, is not limited to the use of a single substance or compound mentioned herein, or which are related to their respective class or groups, but I may also employ two or more of these substances in combination with each other, in connection with the stabilization of halogenated hydrocarbons, or I may use a substance which forms a part of certain compounds mentioned herein.

Strongly basic substances such as aliphatic amines, hydrazines, and hydroxylamines are here included because of their ability to neutralize any acid or acidic substance present, and to retard the formation of acid. However, it is understood that if these substances produce undesirable effects, they may be used in combination with other substances, as aldehydes, e. g., formaldehyde or its polymers, benzaldehyde, heptaldehyde and the like, or ketones, benzil, dibenzyl, benzoyl-acetone, or organic acids, particularly higher fatty acids, as adipic acid, abietic acid, malonic acid, palmitic acid, stearic acid, myristic acid, heptoic acid, nonilic acid, particularly in cases in which the inhibitor has a strongly basic character.

The tests of materials hereinbefore set forth are by way of example only, and are not to be taken as limiting the invention which includes the use of all of those compounds disclosed, as inhibitors for decomposition and corrosion, as well as materials which are merely higher homologues, or derivatives, or substitution products of the disclosed inhibiting compounds. By stabilizing amount I mean a quantity less than about 1% and capable of stabilizing and preventing decomposition of the $CCl_4$.

I claim:

1. Carbon tetrachloride containing a stabilizing amount of an aldehyde ammonia reaction product.

2. Carbon tetrachloride containing a stabilizing amount of hexamethylene tetramine.

3. Carbon tetrachloride containing a stabilizing amount of hexamethylene tetramine dissolved in a solvent.

4. Carbon tetrachloride containing a stabilizing amount of hexamethylene tetramine dissolved in a solvent including polymerized castor oil.

5. Carbon tetrachloride containing about 0.16% hexamethylene tetramine.

EDMUND C. MISSBACH.